US009897067B2

United States Patent
Grasso

(10) Patent No.: US 9,897,067 B2
(45) Date of Patent: Feb. 20, 2018

(54) SWALLOW TAIL AIRFOIL

(71) Applicant: STICHTING ENERGIEONDERZOEK CENTRUM NEDERLAND, Petten (NL)

(72) Inventor: Francesco Grasso, Petten (NL)

(73) Assignee: STICHTING ENERGIEONDERZOEK CENTRUM NEDERLAND, Le Petten (NL)

( * ) Notice: Subject to any disclaimer, the term of this patent is extended or adjusted under 35 U.S.C. 154(b) by 293 days.

(21) Appl. No.: 14/419,572

(22) PCT Filed: Aug. 1, 2013

(86) PCT No.: PCT/NL2013/050575
§ 371 (c)(1),
(2) Date: Feb. 4, 2015

(87) PCT Pub. No.: WO2014/025252
PCT Pub. Date: Feb. 13, 2014

(65) Prior Publication Data
US 2015/0176563 A1   Jun. 25, 2015

(30) Foreign Application Priority Data
Aug. 6, 2012   (NL) .................................... 2009286

(51) Int. Cl.
*F03D 1/06* (2006.01)
*F03D 7/02* (2006.01)
*B64C 3/14* (2006.01)

(52) U.S. Cl.
CPC .............. *F03D 1/0633* (2013.01); *B64C 3/14* (2013.01); *F03D 1/0641* (2013.01); *F03D 7/024* (2013.01);
(Continued)

(58) Field of Classification Search
CPC .... F03D 1/0633; F03D 1/0641; F03D 1/0675; F03D 1/0686; F03D 7/0232; F03D 7/024;
(Continued)

(56) References Cited

U.S. PATENT DOCUMENTS 2,562,227 A * 7/1951 Zobel ........................ B64C 3/14
114/274
3,042,371 A * 7/1962 Fanti ..................... F04D 29/368
244/219
(Continued)

FOREIGN PATENT DOCUMENTS

CN         102094769 A       6/2011
CN         102171097 A       8/2011
(Continued)

OTHER PUBLICATIONS

John Keaton et al.: "Transonic Cascade Measurements to Support Analytical Modeling", Sep. 30, 2007, No. AFOSR Grant FA9550-05-1-0183 Sep. 30, 2007 (Sep. 30, 2007), pp. 1-55, XP007922324, Retrieved from the Internet: URL:http://oai.dtic.mil/oai/oai?verb=getRecord&metadataPrefix=html&identifier=ADA485127 [retrieved on Oct. 15, 2013] figure 6.
(Continued)

*Primary Examiner* — Christopher Verdier
(74) *Attorney, Agent, or Firm* — Young & Thompson

(57) ABSTRACT

The aerodynamic element has a cross section in an airflow direction with a trailing edge (10c). The aerodynamic element (10) further includes a non-symmetrical swallow tail shaped cavity body (1, 2) attached to the trailing edge (10c) of the aerodynamic element (10). The aerodynamic element (10) is e.g. applied in a rotor blade for a wind turbine.

15 Claims, 1 Drawing Sheet

Figure 1:
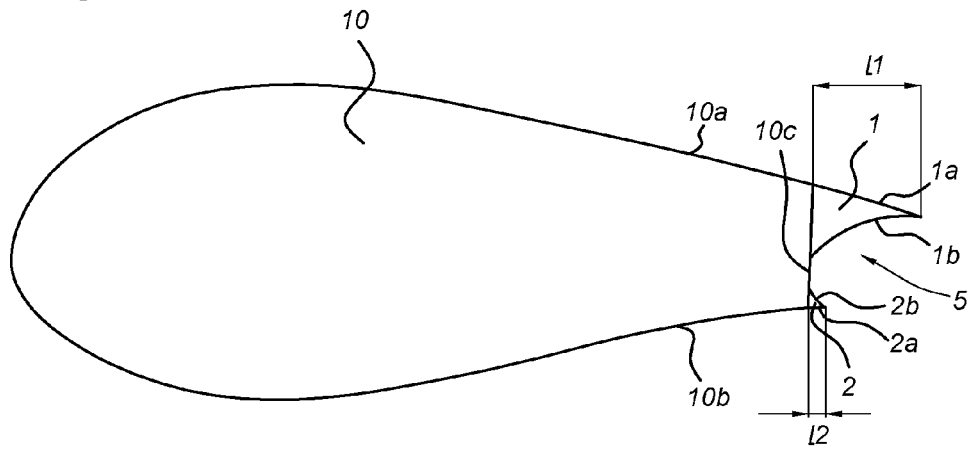

(52) U.S. Cl.
CPC ...... *F03D 7/0232* (2013.01); *B64C 2003/147* (2013.01); *F05B 2240/301* (2013.01); *Y02E 10/721* (2013.01); *Y02T 50/12* (2013.01)

(58) Field of Classification Search
CPC .. Y02E 10/721; F05B 2240/301; Y02T 50/12; Y02T 50/16; Y02T 50/166; Y02T 50/168; B64C 3/14; B64C 2003/147; B64C 2003/148; B64C 3/28; B64C 11/18; B64C 21/00; B64C 21/02; B64C 21/08; B64C 2230/00; B64C 2230/04; B64C 2230/06; B64C 2230/08; B64C 2230/20; B64C 2230/28
USPC .... 416/23, 24, 228, 235, 236 R, 237, 231 B, 416/223 R
See application file for complete search history.

(56) References Cited

U.S. PATENT DOCUMENTS

| | | | |
|---|---|---|---|
| 7,946,803 | B2 | 5/2011 | Wobben |
| 2007/0158503 | A1* | 7/2007 | Burg ............... B63B 1/248 244/215 |
| 2007/0224029 | A1* | 9/2007 | Yokoi ............... F03D 3/005 415/4.2 |
| 2009/0263252 | A1* | 10/2009 | Slot ............... F03D 1/0641 416/223 R |
| 2010/0028161 | A1* | 2/2010 | Vronsky ............... F03D 1/0641 416/238 |
| 2010/0215493 | A1* | 8/2010 | Abdallah ............ F03D 7/0232 416/23 |
| 2011/0248122 | A1 | 10/2011 | Schlipf et al. |
| 2013/0094970 | A1* | 4/2013 | Fukami ............... F03D 1/0633 416/223 R |

FOREIGN PATENT DOCUMENTS

| | | |
|---|---|---|
| EP | 0 234 768 A2 | 9/1987 |
| EP | 1757806 A1 | 2/2007 |
| EP | 2604856 A1 | 6/2013 |
| IT | 20070021 A1 | 11/2008 |
| WO | 2009/030113 A1 | 3/2009 |
| WO | WO 2010/040501 A2 * | 4/2010 ............... B64C 9/24 |

OTHER PUBLICATIONS

Do T et al.: "Numerical study of turbulent trailing-edge flows with base cavity effects using URANS", Journal of Fluids and Structures, Academic Press, Amsterdam, NL, vol. 26, No. 7-8, Oct. 1, 2010 (Oct. 1, 2010), pp. 1155-1173, XP027503591, ISSN: 0889-9746, DOI: 10.1016/J.JFLUIDSTRUCTS.2010.07.006 [retrieved on Oct. 1, 2010] figure 1 tables 1,5 paragraph [03.4].

J. F Olsen et al.: "Vortex shedding behind modified circular cylinders", Journal of Wind Engineering and Industrial Aerodynamics, vol. 86, No. I, May 1, 2000 (May 1, 2000), pp. 55-63, XP055060639, ISSN: 0167-6105, DOI: 10.1016/S0167-6105(00)00003-9 figure 1 p. 2.

J. P. Baker et al.: "Drag Reduction of Blunt Trailing-Edge Airfoils", Department of Mechanical and Aeronautical, Blunt trailing edge, Drag reduction, Airfoil, CFD, Experiment, BBAA VI International Colloquium on: Bluff Bodies Aerodynamics & Applications Milano, Italy, Jul. 20-24, 2008.

Van Dam et al.: "Trailing Edge Modifications for Flatback Airfoils", Sandia is a multiprogram laboratory operated by Sandia Corporation, a Lockheed Martin Company, for the United States Department of Energy's National Nuclear Security Administration under Contract DE-AC04-94AL85000.Prepared by Sandia National Laboratories Sandia Report SAND2008-1781 Unlimited Release Printed Mar. 2008.

International Search Report, dated Oct. 23, 2013, from corresponding PCT application.

Chinese Office Action issued in Application No. 201380041923.5, dated Dec. 21, 2016, with English Translation.

Nov. 14, 2017, EP communication issued for related EP application No. 13747895.4.

* cited by examiner

SWALLOW TAIL AIRFOIL

FIELD OF THE INVENTION

The present invention relates to an aerodynamic element, e.g. for a wind turbine rotor blade, having a cross section in an airflow direction with a trailing edge of the flatback airfoil (or blunt railing edge) type. The aerodynamic element may also be provided in other applications, such as wing bodies, etc. In a further aspect, the present invention relates to a rotor blade of a wind turbine.

PRIOR ART

Blunt trailing edge or flatback airfoils are examples of aerodynamic elements used in many aerodynamic applications, meeting the structural and volume requirements of these applications, such as in blended wing-body aircraft, unmanned aerial vehicles and wind turbine blades. Further modifications to flat-back airfoils are known in the art to address associated problems. One of these modifications is the usage of active flow control devices like micro-tabs, synthetic jets and micro-flaps (usually referred as smart controls). These devices are able to introduce modifications in the local flow field and help to reduce e.g. drag. However, all of these types of solutions introduce more complexity in the airfoil. As a consequence, there is an increase in the cost of development and/or production in order to implement such solutions. Also, there is a cost in case of maintenance (especially for the actuators) and actually, already in the design phase, more expensive and complex tools are needed to design the actuators and predict their effects on e.g. turbine performance. An alternative are for example split plates. These are plates applied in chord direction to the trailing edge of flat-back airfoils.

The publication 'Trailing Edge Modifications for Flatback Airfoils' By C. P. van Dam et al., Sandia Report SAND2008-1781, March 2008 discloses a number of modifications provided for flatback airfoils (or blunt trailing edge airfoils) which are applied in wind turbine blades, including rounded trailing edge, base cavity, slotted/perforated cavity, splitter plate, and a serrated trailing edge.

The article 'Drag Reduction of blunt trailing-edge airfoils' by J. P. Baker and C. P. van Dam, BBAA VI International Colloquium on Bluff Bodies Aerodynamics & Application, Milano, Italy, Jul. 20-24, 2008 discloses solutions to reduce drag of blunt trailing-edge airfoils which are applied in various aerodynamic systems, including wind turbine blades. Several embodiments of adaptations of the trailing edge of an airfoil are suggested, including a splitter plate, a base cavity using two splitter plates, and an offset cavity using two plates.

A further prior art publication is the article by Thu Thau, Li Chenb, Jiyuan Tu 'Numerical study of turbulent trailing-edge flows with base cavity effects using URANS', in Journal of Fluids and Structures, part 26, nr 7-8, pages 1155-1173. This article discloses several aerodynamic elements at the trailing edge of the aerodynamic elements. In Table 1 and 5, for example, a Squared-off Blunt (A), Triangular Cavity (B) Semi-Circular Cavity (C), and a Rectangular Cavity (D) are shown.

SUMMARY OF THE INVENTION

The present invention seeks to provide an improved design of the airfoil shape of a wing body, such as the rotor blade of a wind turbine.

According to the present invention, an aerodynamic element according to the preamble defined above is provided, wherein the aerodynamic element further comprises a swallow tail shaped cavity body attached to the trailing edge of the aerodynamic element. The swallow tail shaped cavity body comprises a first member having a top surface flush with an upper surface of the aerodynamic element, and a second member having a bottom surface flush with a lower surface of the aerodynamic element, the first member and second member further forming a cavity between them. The first member and second member are positioned at the top part and bottom part, respectively, of the (flat-back) trailing edge, thus forming a swallow tail shaped cavity in between. The cavity has a non-symmetrical (cross sectional) profile. This is e.g. implemented by choosing a length of the first member in an airflow direction of the aerodynamic element longer than a length of the second member in the airflow direction of the aerodynamic element (i.e. over and under the aerodynamic element). The swallow tail shaped cavity body will influence the airflow around the aerodynamic element in a positive manner, and will result in a better performance.

In a further embodiment, a lower surface of the first member and an upper surface of the second member form a single concave shaped trailing edge surface. Alternatively, a lower surface of the first member and an upper surface of the second member form a sharp edged surface.

The second member is movably attached to the trailing edge of the aerodynamic element in a further embodiment, allowing further adaptation of the aerodynamic element after installation of the second member to be able to adapt to actual circumstances. An actuator operatively connected to the second member may be provided for controlling the angle of the lower surface of the second member with respect to the lower surface of the aerodynamic element. This allows an active control of the cavity body, even during operation.

In an embodiment, the first member and second member are combined in a single swallow tail shaped cavity body, which makes assembly and attachment more simple and cost effective. Alternatively, the first member and second member are separate elements.

In a further aspect, the present invention relates to a rotor blade for a wind turbine, wherein the rotor blade is provided at least partly with an aerodynamic element according to any one of the above described embodiments. A specific part of a rotor blade for a wind turbine is usually provided with a flat-back trailing edge to meet structural requirements. The aerodynamic element is provided in a part of the rotor blade having a flat-back trailing edge to obtain the improvements in aerodynamic behavior. In a further embodiment, the aerodynamic element is provided in a part of the rotor blade having a substantially cylindrical cross section. The presence of such a cylindrical cross section is usually also determined by structural requirements, and operational performance can thus be enhanced using the present invention embodiments.

SHORT DESCRIPTION OF DRAWINGS

Figure 2:
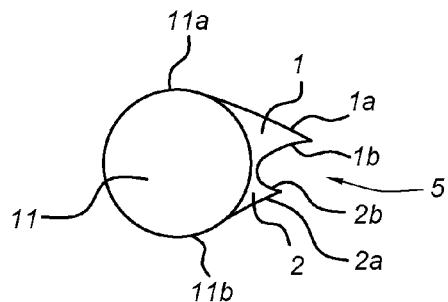
Figure 3:
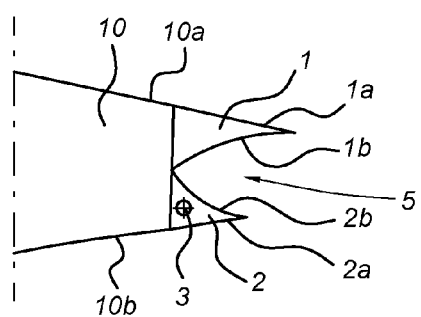

The present invention will be discussed in more detail below, using a number of exemplary embodiments, with reference to the attached drawings, in which FIG. 1 shows a cross sectional view of an aerodynamic element according to a first embodiment of the present invention;

FIG. 2 shows a cross sectional view of an aerodynamic element according to a further embodiment of the present invention; and FIG. 3 shows a partial cross sectional view of an aerodynamic element according to an even further embodiment of the present invention.

DETAILED DESCRIPTION OF EXEMPLARY EMBODIMENTS

The root region of a wind turbine blade has to guarantee the structural properties of the blade, even if that would penalizing the aerodynamic performance of that part. However, with the increasing size of wind turbines, good aerodynamic characteristics at the root are desirable to increase the overall performance of the blade.

Flat-back thick airfoils are popular nowadays as aerodynamic element in e.g. wind turbine rotor blades because the blunt shape of the trailing edge contributes to improve the lift performance of the airfoil and also preserving its structural properties. The drawback of such solution is the increase of the base drag, flow unsteadiness and, as a consequence, the increase in noise (although the noise at the root is not the main source of noise).

FIG. 1 shows a cross sectional view of a flat-back airfoil 10 along the airflow direction of e.g. a wind turbine rotor blade. The rotor blade is provided at least partly (along its length) with an aerodynamic element according to one of the present invention embodiments, e.g. in a part of the rotor blade having a flat-back trailing edge 10c. The flat-back airfoil 10 is a specific type of aerodynamic element and has an upper surface 10a and a lower surface 10b, which are differently shaped in order to provide lift. The trailing edge 10c of the airfoil 10 is a substantially flat surface.

This embodiment of the flat-back airfoil 10 is furthermore provided with a first member 1 and a second member 2, which are attached to the trailing edge 10c of the airfoil 10. The first member 1 has a top surface 1a which is flush with the upper surface 10a of the airfoil 10. Similarly, the second member 2 has a bottom surface 2a which is flush with the lower surface 10b of the airfoil 10. This has the effect that the upper surface 10a of the airfoil is aerodynamically extended over a length $l_1$ of the first member 1, and that the lower surface is aerodynamically extended over a length $l_2$ of the second member 2.

In between the first and second member 1, 2, a cavity 5 is formed which influences the aerodynamic behavior of the airfoil 10. The first member 1 and second member 2 in other words form a swallow tail shaped cavity body which is fitted at the trailing edge 10c of the airfoil 10.

In an embodiment, the length $l_1$ of the first member 1 is larger than the length $l_2$ of the second member 2. Thus, in other words, a non-symmetrical profile is created by the first and second member.

As shown in the embodiment of FIG. 1, a lower surface 1b of the first member 1 is provided, which is curved. Also, an upper surface 2b of the second member 2 is provided as a curved surface.

By adopting the innovative shape, the main advantages of a flat-back airfoil 10 are kept, but the same time, bad side-effects are reduced. Because of the non-symmetrical cavity 5, when the flow separates from the bottom surface 2a, it merges to the flow on the other side (from the upper surface 1a of the first member 1) in a "smoother" way, leading to better performance. The adapted trailing edge part of the airfoil 10 introduces a perturbation in the trailing edge flow field, leading to a reduction in noise, base drag and flow unsteadiness. No mobile or moving parts are involved in this solution, so there is less cost for installation, maintenance and production.

In FIG. 2 a cross sectional view is shown of a further embodiment of the present invention. Here, the first and second member 1, 2 are combined as a single swallow tail shaped cavity body, and attached to a substantially circular cross sectional part 11. This circular cross sectional part 11 is e.g. the cylindrically shaped root part of a wind turbine rotor blade closest to the hub of the wind turbine (which in many cases is circular to allow easy pitch control of the rotor blade). The aerodynamic element 11 is in this case provided in a part of the rotor blade having a substantially cylindrical cross section.

The combined first and second member 1, 2 are different from the embodiment with first member 1 and second member 2 as separate elements in the embodiment of FIG. 1. This would allow easier assembly of the first and second member 1, 2 to the trailing edge of the aerodynamic element 11.

As in the embodiment described with reference to FIG. 1, the first member 1 has a top surface 1a which is flush with an upper surface 11a of the circular part 11 (which can be seen as a specific species of possible shapes of an airfoil 10). Similarly, the second member 2 has a bottom surface 2a which is flush with the lower surface 11b of the circular part 11.

As can be seen in the cross sectional view of FIG. 2, the cavity 5 of the combined first and second member 1, 2 is a single concave shaped trailing edge surface. Concave means arched in or curved inward. The opposite of concave is convex, which means curved out or rounded outward. A concave line in an object (in this case the outer circumference of the cross section of the airfoil 10) describes a pair of points joined by a line, where not all points on the line are in the object. A convex line describes a pair of points joined by a line, where all points on the line are also in the same object.

In FIG. 3, a partial cross sectional view is shown of a further embodiment of an airfoil 10 provided with a first and second member 1, 2. In this embodiment, the lower surface 1b of the first member 1 and the upper surface 2b of the second member 2 form a sharp edged surface defining the cavity 5 between them. The curved surfaces 1b, 2b as shown may also be implemented as straight surfaces.

Furthermore, in this embodiment, the second member 2 is movably attached to the trailing edge surface 10c of the airfoil 10, e.g. pivotable around an axis indicated by reference numeral 3. The bottom surface 2a of the second member 2 is still held flush with a lower surface 10b of the airfoil in order to maintain a non-disturbed airflow in operation. However, the adjustable second member 2 can be used to fine tune the aerodynamic behavior of the airfoil 10 as a whole.

In an even further embodiment the adjustable second member 2 is controlled using an actuator 3 which is operatively connected to the second member 2 for controlling the angle of the lower surface 2a of the second member 2 with respect to the lower surface 10b of the airfoil 10.

The airfoil 10 in combination with the swallow tail shaped cavity body 1, 2 as described above in various embodiment can also be seen as a new geometry for an airfoil as such. From the production point of view in particular, the shape of the trailing edge 10c of the airfoil 10 could be adapted with specific add-on implementations for the first and/or second member 1, 2, instead of designing a special mold for the entire airfoil 10, with cost benefits. Also, adaptation of existing airfoils 10 is then possible, even when already installed (e.g. as rotor blades of a wind turbine).

The present invention embodiments have been described above with reference to a number of exemplary embodiments as shown in the drawings. Modifications and alternative implementations of some parts or elements are possible, and are included in the scope of protection as defined in the appended claims.

The invention claimed is:

1. An aerodynamic element comprising:
an upper suction surface,
a lower pressure surface,
a cross section in an airflow direction with a flat trailing edge of a flatback airfoil type, and
a swallow tail shaped recessed body attached to the flat trailing edge of the aerodynamic element,
wherein the swallow tail shaped recessed body comprises
i) a first member having a top surface flush with the upper suction surface of the aerodynamic element, and
ii) a second member having a bottom surface flush with the lower pressure surface of the aerodynamic element, the first member and second member further forming a recess between them,
wherein the recess has a non-symmetrical profile,
wherein a length of the first member in the airflow direction is longer than a length of the second member in the airflow direction,
wherein the first member and second member are separate elements, and
wherein a lower surface of the first member and an upper surface of the second member form a single concave shaped trailing edge surface.

2. The aerodynamic element of claim 1, wherein the lower surface of the first member and the upper surface of the second member form a sharp edged surface.

3. The aerodynamic element of claim 1, wherein the lower surface of the first member and the upper surface of the second member form an edged surface.

4. The aerodynamic element of claim 1, wherein the first member and second member are combined in a single swallow tail shaped recessed body.

5. A rotor blade for a wind turbine, wherein the rotor blade is provided at least partly with an aerodynamic element having a cross section in an airflow direction with a flat trailing edge of a flatback airfoil type,
wherein the aerodynamic element further comprises an upper suction surface, a lower pressure surface, and a swallow tail shaped recessed body attached to the trailing edge of the aerodynamic element,
wherein the swallow tail shaped recessed body comprises a first member having i) a top surface flush with the upper suction surface of the aerodynamic element, and ii) a second member having a bottom surface flush with the lower pressure surface of the aerodynamic element, the first member and second member further forming a recess between them,
wherein the recess has a non-symmetrical profile,
wherein a length of the first member in the airflow direction is longer than a length of the second member in the airflow direction,
wherein the first member and second member are separate elements, and
wherein a lower surface of the first member and an upper surface of the second member form a single concave shaped trailing edge surface.

6. The rotor blade of claim 5, wherein the lower surface of the first member and the upper surface of the second member form a sharp edged surface.

7. The rotor blade of claim 5, wherein the lower surface of the first member and the upper surface of the second member form an edged surface.

8. The rotor blade of claim 5, wherein the first member and second member are combined in a single swallow tail shaped recessed body.

9. The rotor blade of claim 5, wherein the aerodynamic element is provided in the flatback trailing edge of the rotor blade.

10. The rotor blade of claim 5, wherein the aerodynamic element is provided in a part of the rotor blade having a substantially cylindrical cross section.

11. The rotor blade of claim 5, wherein the aerodynamic element is provided in a part of the rotor blade having a cylindrical cross section.

12. An aerodynamic element comprising:
an upper suction surface,
a lower pressure surface,
a cross section in an airflow direction with a flat trailing edge of a flatback airfoil type,
a swallow tail shaped recessed body attached to the flat trailing edge of the aerodynamic element,
wherein the swallow tail shaped recessed body comprises
i) a first member having a top surface flush with the upper suction surface of the aerodynamic element, and
ii) a second member having a bottom surface flush with the lower pressure surface of the aerodynamic element, the first member and second member further forming a recess between them,
wherein the recess has a non-symmetrical profile,
wherein a length of the first member in the airflow direction is longer than a length of the second member in the airflow direction,
wherein the first member and second member are separate elements,
wherein the second member is movably attached to the trailing edge of the aerodynamic element, and
an actuator operatively connected to the second member for controlling the angle of the lower surface of the second member with respect to the lower pressure surface of the aerodynamic element.

13. The aerodynamic element of claim 12, wherein a lower surface of the first member and an upper surface of the second member form a sharp edged surface.

14. The aerodynamic element of claim 12, wherein a lower surface of the first member and an upper surface of the second member form an edged surface.

15. The aerodynamic element of claim 12, wherein the first member and second member are combined in a single swallow tail shaped recessed body.

* * * * *